United States Patent [19]
Bolden

[11] Patent Number: 4,811,968
[45] Date of Patent: Mar. 14, 1989

[54] COLLAPSIBLE CART

[75] Inventor: Ronald J. Bolden, Houston, Tex.

[73] Assignee: USEC, Inc., Winchester, Va.

[21] Appl. No.: 178,559

[22] Filed: Apr. 7, 1988

[51] Int. Cl.[4] .............................................. B62B 1/04
[52] U.S. Cl. ................... 280/652; 16/114 R;
280/47.18; 280/47.26; 280/47.33; 280/63;
280/655; 296/27; 403/108
[58] Field of Search ............... 280/652, 653, 655, 656,
280/639, 47.26, 63, 47.18, 47.33, 47.31, 47.37;
403/108, 378, 379; 296/35.3, 27; 16/114 R,
DIG. 24, DIG. 25; 248/297.2; 206/509

[56] References Cited

U.S. PATENT DOCUMENTS

| | | | |
|---|---|---|---|
| 2,453,246 | 11/1948 | Moksnes | 280/47.33 |
| 2,984,499 | 5/1961 | Humphrey | 280/47.37 R |
| 3,236,198 | 2/1966 | Kreft | 296/27 |
| 3,636,913 | 1/1972 | O'Brien | 403/108 |
| 3,865,239 | 2/1975 | Herolzer et al. | 206/509 |
| 4,372,568 | 2/1983 | Campbell | 280/656 |
| 4,582,333 | 4/1986 | Doering | 280/63 |
| 4,635,956 | 1/1987 | Morrissette | 280/659 |

FOREIGN PATENT DOCUMENTS

| | | | |
|---|---|---|---|
| 137418 | 5/1950 | Australia | 280/63 |
| 2357411 | 3/1978 | France | 280/47.31 |
| 1074031 | 6/1967 | United Kingdom | 280/652 |

*Primary Examiner*—Charles A. Marmor
*Assistant Examiner*—Eric Culbreth
*Attorney, Agent, or Firm*—Cullen, Sloman, Cantor, Grauer, Scott & Rutherford

[57] ABSTRACT

A collapsible cart comprises a base an adjacent one and a transverse axle mounting a pair of wheels. A collapsible basket is removably secured to the base and a handle socket extends upwardly from the other end of the base forwardly of the basket. A formed handle has one end portion removably nested and secured within the socket, with its other end projecting forwardly, its one end portion providing a central support for the cart.

1 Claim, 1 Drawing Sheet

U.S. Patent    Mar. 14, 1989    4,811,968
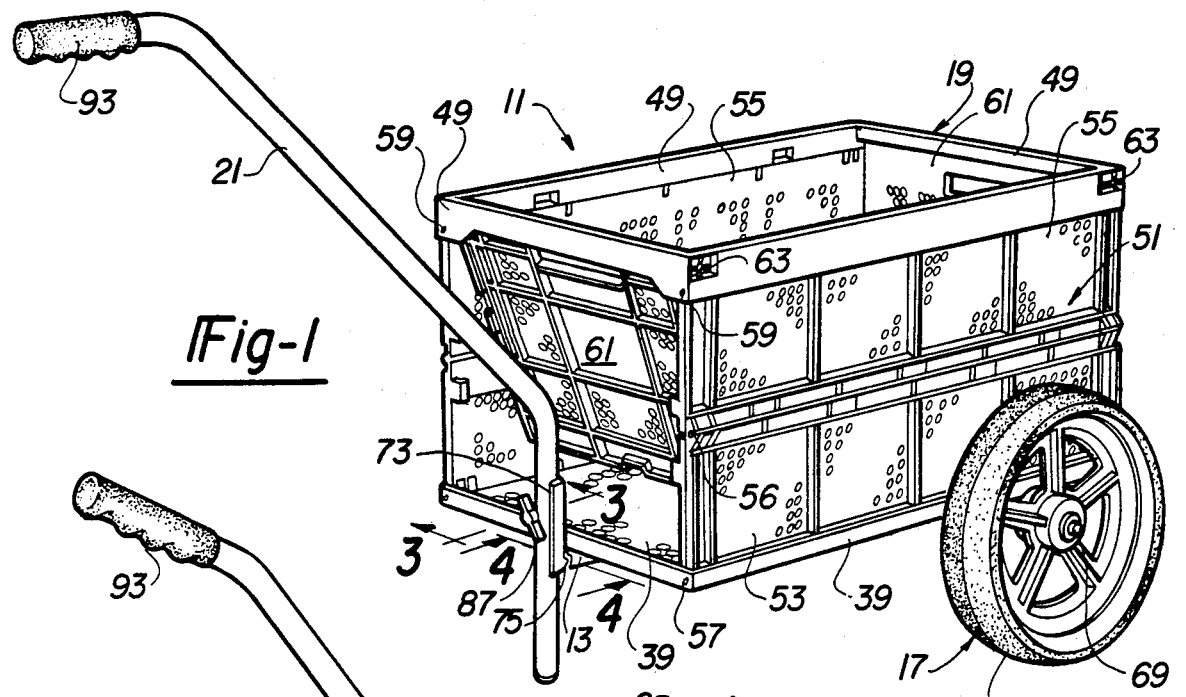
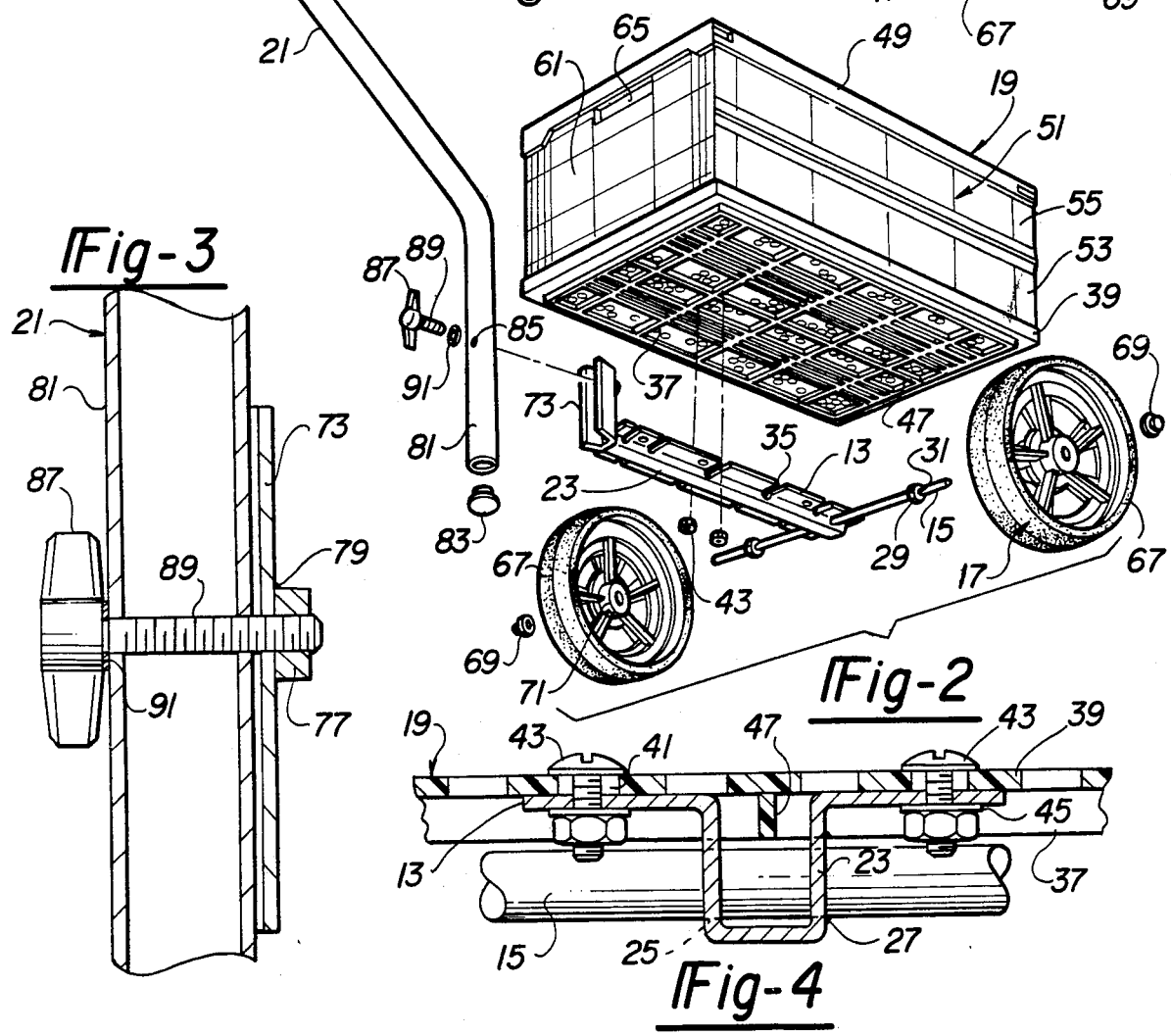

COLLAPSIBLE CART

FIELD OF THE INVENTION

The present invention relates to utility carts with central front leg and rear wheels and mounted thereon a basket which may be collapsed to a compact position.

BACKGROUND OF THE INVENTION

Previously, collapsible carts have been used for a variety of purposes. Upon a framework are mounted a pair of wheels and a basket and some form of handle or other support for pulling the cart and for maintaining it in a stationary position.

One of the problems with previous carts has been the difficulty in collapsing the cart to a smaller non-use position and wherein it is desirous to have a basket which collapses and a handle which can be separated from the cart for easy packing, shipment and storage.

THE PRIOR ART

Utility carts and collapsible carts are shown in one or more of the following U.S. patents:

|  | Inventor | Filed |
|---|---|---|
| U.S. Des. Pat. No. | | |
| 155,640 | H. Stoll | October 18, 1949 |
| 178,526 | Leach et al. | August 14, 1956 |
| 180,543 | Best | July 2, 1957 |
| 246,300 | Dortch et al. | November 8, 1977 |
| 252,264 | Paterson | July 3, 1979 |
| 260,753 | Partain | September 15, 1981 |
| 280,039 | Strayer | August 6, 1985 |
| 288,497 | Morrissette | February 24, 1987 |
| 289,816 | Morrissette | May 12, 1987 |
| 289,817 | Morrissette | May 12, 1987 |
| U.S. Pat. No. | | |
| 3,985,372 | Olsson | October 12, 1976 |
| 4,253,677 | Wissler | March 3, 1981 |
| 4,266,791 | Myers | May 12, 1981 |
| 4,506,897 | Libit | March 26, 1985 |
| 4,540,196 | Paping et al. | September 10, 1985 |
| 4,570,958 | Walker | February 18, 1986 |
| 4,635,956 | Morrissette | January 13, 1987 |

Many of these patents show a framework, wheels, a stand and a handle.

SUMMARY OF THE INVENTION

An important feature of the present invention is to provide a collapsible cart which comprises a base or base plate and a transverse axle secured to the base adjacent one end, projecting therefrom and mounting a pair of wheels. An upwardly extending socket mounts a forwardly extending handle, whose one end provides a cart support.

As another feature, a collapsible basket of rectangular shape overlies, is mounted upon and removably secured to the base.

As another feature there is provided a handle socket secured to the base forwardly of the basket into which one end of a formed handle is projected and retained and with the other end of the handle projecting forwardly.

As another feature, the collapsible basket includes a rectangular bottom wall which has opposed sides and ends. A plurality of spaced longitudinal ribs connect the ends, and a plurality of transverse ribs connect the sides.

As another feature, the collapsible basket includes a bottom wall and a top frame with collapsible side walls at their lower ends hinged to the bottom wall and with each side wall including a pair of upper and lower sections pivotally connected together along their length and with the upper section along its length pivotally connected to the top frame. A pair of end walls are interposed between opposite ends of the side walls and at their upper ends pivotally connected to the top frame. When the end walls are upright they normally maintain the side walls in an upright position, and when the end walls are pivotal to horizontal position the side walls can collapse into surface engagement with the bottom wall.

As another feature, the present collapsible cart includes an elongated base plate which supportably underlies the basket and is removably secured thereto. The base plate includes an elongated reinforcement channel which is transversely apertured to receive and support the transverse axle shaft welded thereto upon the end of which a pair of wheels are journaled and retained.

As another feature, there is provided upon one end of the base plate an elongated forwardly extending U-shaped socket into which is positioned and removably secured a tubular handle which extends forwardly at one end, with its other end extending downwardly to provide a central support for the cart.

These and other objects and features will be seen in the following specifications and claims in conjunction with the appended drawing.

THE DRAWINGS

FIG. 1 is a front perspective view of the present collapsible cart;

FIG. 2 is a perspective exploded view thereof;

FIG. 3 is a fragmentary section taken in the direction of arrows 3—3 of FIG. 1, on an increased scale; and FIG. 4 is a fragmentary section taken in the direction of arrows 4—4 of FIG. 1, on an increased scale.

It will be understood that the above drawing illustrates merely a preferred embodiment of the invention, and that other embodiments are contemplated within the scope of the claims hereinafter set forth.

DETAILED DESCRIPTION OF AN EMBODIMENT OF THE INVENTION

Referring to the drawing, FIGS. 1-4 the present collapsible cart 11 generally includes base or elongated base plate 13, FIG. 2, and axle shaft 15 mounting the wheels 17. Collapsible basket 19 overlies the base 13 and is removably secured thereto. The handle 21 is secured at the forward end of the cart and projects forwardly thereof with a portion thereof serving as a central support for the cart.

The present base or base plate 13 includes an elongated stiffener channel 23 which extends along its length and has a pair of opposed transverse apertures 25 adjacent one end thereof, FIG. 4, through which is projected axle shaft 15 secured thereto by the welds 27. A pair of stop washers 29 are mounted upon axle shaft 15 inwardly of their ends, FIG. 2, and welded thereto at 31.

The base plate 13 along its length has a series of transverse parallel slotted portions 35 adapted to cooperated receive cross ribs 37 upon the under surface of bottom wall 39 of the basket as a part thereof, FIG. 4.

Bottom wall 39 has a plurality of apertures 41 therethrough, through which extend threaded fasteners 43, FIG. 2, for securing the basket along its length to the base or base plate 13, FIG. 4. Removable lock washers 45 are interposed on fasteners 43.

Upon the undersurface of bottom wall 39 of the basket 19 are a series of spaced longitudinal ribs 47. Upon the assembly of base plate 13 to bottom wall 39, a central longitudinal rib 47 is nested within channel 23.

COLLAPSIBLE BASKET

The collapsible basket 19 further includes an open rectangular top frame 49 and a pair of spaced opposed collapsible side walls 51. Said side walls include a bottom section 53 and a top section 55 pivotally interconnected by a series of aligned longitudinally extending pivot pins 56, FIG. 1. Bottom section 53 is pivoted to bottom wall 39 by a series of aligned pivot pins 57. The top section 51 is similarly pivoted to frame 49 by a series of pivot pins 59.

The collapsible basket 19 includes a pair of opposed upright end walls 61 at their upper ends positioned between the respective side walls 51 and pivotally connected to the top frame by the corresponding transverse pivot pins 63. Each of the respective end walls 61 at their upper ends have a rectangular grip opening 65 to facilitate pivotal movements of the end walls either to the upright position, FIG. 2, or pivoted to a horizontal position within the plane of the frame 49. This permits downward and inward collapse of the corresponding side walls 51 upon their respective pivot pins 56 and 57 to a collapsed position resting upon bottom wall 39.

In the illustrative embodiment the wheels 17 are of a unit molded plastic construction over which are stretched and positioned the molded rubber tires 67. The wheels include the hub 71 of a molded plastic material assembled upon the ends of axle shaft 15 against stop washers 29 and retained in position by the corresponding Tinnermann TM nuts 69 which are crimped over the ends of said shaft.

Secured to the forward end of base plate 13 outwardly of basket 19 is the forwardly and upwardly extending handle socket 73 of generally U-shape. Said socket is secured at the forward end of base plate by welds 75, FIG. 1. A fastener nut 77, FIG. 3, is secured upon the back side of handle socket 73 by the welds 79.

Handle 21 has a depending end portion 81 which nests within socket 73 and is secured thereto by hand fastener 87. Tubular handle 21 at one end 81 has mounted therein the end cap 83 adapted for registry with the ground surface centrally of the cart as a third support therefor. Hand fastener 87 includes a threaded shank 89 which extends through aperture 85 in handle portion 81 and through fastener 77 for securing to the handle socket 73 with a suitable lock washer 91 interposed. The other end of handle 21 terminates in hand grip 93 constructed of rubber or PCV.

In operation with the basket 19 collapsed so that the foldable side walls 51 are parallel and in an engagement with each other and with the bottom wall 39, the collapsible cart may be stored in a vehicle trunk or mounted upon a building wall such as within a garage or upon a patio wall, for illustration.

The cart when collapsed can be used for carrying bulky items such as luggage, shrubbery or flowers. It is essentially used in the open position, FIG. 1 for transporting personal goods on a beach, for picnics, camping, fishing, boat gear, shopping groceries and laundry. The cart can go anywhere including upstairs as desired. A second basket can be nested upon the first basket and interlocked therewith for carrying more cargo.

There is provided a simple means by which the handle 21 may be removed from socket 73 upon one end of base plate, by removal of hand fastener 87 to facilitate storage and shipping or when the cart is not in use.

I claim:

1. A collapsible cart comprising a base;
a transverse axle shaft connected to the base adjacent one end thereof and mounting a pair of wheels;
a collapsible basket of rectangular shape overlying, mounted upon and removably secured to the base and positioned between said wheels;
a handle socket forwardly of the other end of said base and secured thereto;
a formed central handle having one end portion aligned with and removably nested and secured within said socket, with its other end projecting forwardly, said one end portion providing an upright central support for the cart;
said basket including a rectangular bottom wall including opposed sides and ends, a plurality of spaced longitudinal ribs connecting said ends; and
a plurality of transverse ribs connecting said sides;
said base including an elongated base plate centrally underlying and supporting said bottom wall;
a plurality of fasteners inter-connecting said bottom wall and base plate;
an elongated stiffener channel centrally underlying and connected to said base plate;
said axle shaft extending transversely through said channel adjacent one end and secured thereto;
there being a plurality of longitudinally spaced and transverse slots formed in said base plate and channel cooperatively receiving the transverse ribs, said channel receiving one of said longitudinal ribs.

* * * * *